Oct. 2, 1956

T. NELSON 2,764,994

PULSATING TIRE INFLATING DEVICE HAVING FULL TIME PRESSURE ADJUSTMENT

Filed Dec. 7, 1950

INVENTOR.
TED NELSON

BY Henry Gifford Hardy.

ATTORNEY

United States Patent Office 2,764,994

Patented Oct. 2, 1956

1

2,764,994

PULSATING TIRE INFLATING DEVICE HAVING FULL TIME PRESSURE ADJUSTMENT

Ted Nelson, San Leandro, Calif., assignor to Nelson Specialty Corporation, San Leandro, Calif., a corporation of California Application December 7, 1950, Serial No. 199,636

3 Claims. (Cl. 137—224.5)

This invention relates to an automatic tire inflating device. More particularly, it relates to a tire inflating device which is operable to automatically inflate a tire to a predetermined pressure in accordance with the setting of a dial and which, when desired, may be adjusted to deliver full line pressure to a tire.

This application is an improvement on the copending application, Serial No. 107,090, filed July 27, 1949, entitled "Automatic Snap-Acting Fluid Pressure Inflator," now Patent No. 2,638,113, issued May 12, 1953.

In the above mentioned patent there is described an automatic tire inflating device which is operable to automatically inflate a tire or the like to a predetermined pressure in accordance with the setting of a dial. In certain instances, as, for example, in inflating large truck tires, it is desirable, in the interest of economy of time and of labor, to deliver full line pressure to the tire, at least during the initial stages of inflation. To this end it is desirable to provide an automatic tire inflating device of the character described in the co-pending application, which can also be set or adjusted to deliver full line pressure. That is, it is desirable to provide an over-ride or by-pass feature for over-riding or by-passing the automatic features.

It is, therefore, an object of the present invention to provide an automatic tire inflating device which is capable of inflating a tire to a predetermined pressure in accordance with a dial setting, and which is also adjustable so as to deliver full line pressure to the tire.

It is a particular object of the present invention to provide an over-ride or by-pass feature for the automatic tire inflating device of the above mentioned patent, which is easily added thereto without the necessity of extensive redesigning, and which is operable by the same means employed to operate and adjust the automatic features of the device.

Yet another particular object of the present invention is to provide an override or by-pass feature of the character and for the purpose described, which is adjustable to deliver full line pressure in excess of the dial setting, e. g., to deliver full line pressure when the adjustment dial is set to read above 30 pounds, 40 pounds or 45 pounds, as desired.

A further object of the present invention is to provide a means for securing the full line pressure at an accurate predetermined adjustment without reliance upon the vagaries of springs and the like.

These and other objects of the invention will be apparent from the ensuing description and the appended claims.

One form which the invention may assume is illustrated by way of example in the accompanying drawings and is described in detail hereinafter.

2

Figures 2, 3:
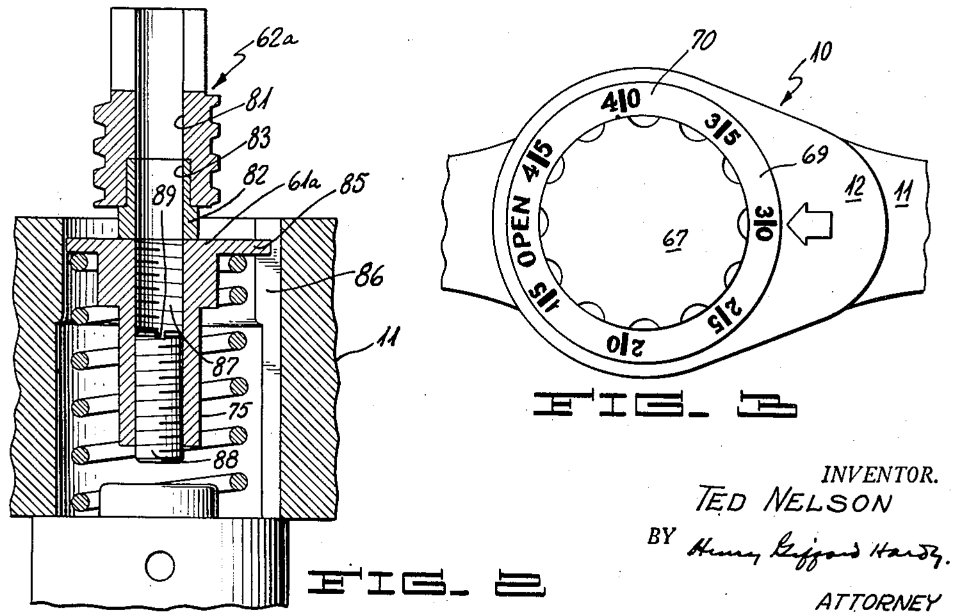
Figure 2 is a similar but fragmentary view of a modification having a preferred type of construction.

Figure 3 is a fragmentary top plan view showing the dial for either form of device.

Figure 1:
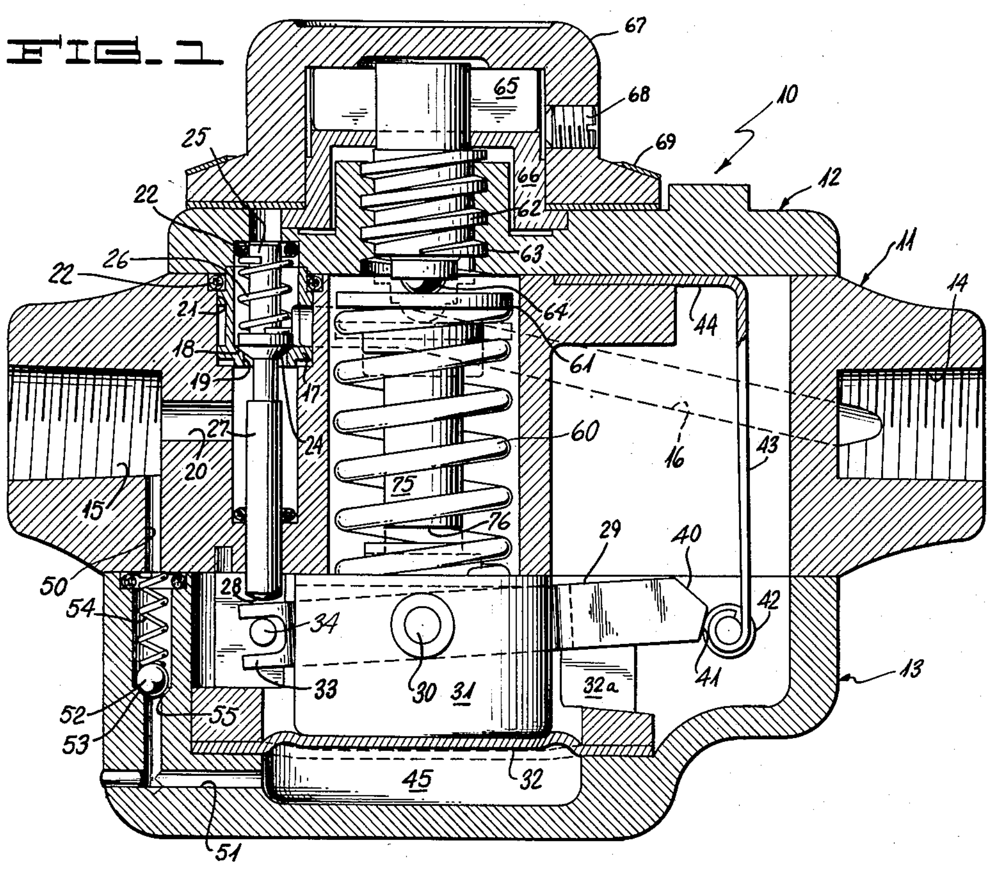
Figure 1 is a vertical mid-sectional view through one form of tire inflating device of the present invention.

Referring now to the drawings, and more particularly to Figure 1 thereof, the tire inflating device there illustrated and which is designated as a whole by the numeral 10, is generally similar in structure and operation to that described in the above mentioned patent. Thus, it comprises a central housing 11, a top cover member 12, and a bottom cover member 13, each of which may be a casting and is preferably constructed of a light alloy such as an aluminum alloy. These main housing elements may be joined by any suitable means (not shown), such as screws. The central housing 11 is formed with a threaded air inlet 14 for coupling to an air supply hose (not shown) connected to a source of air under pressure. The housing 11 is also formed, diametrically opposite the air inlet 14, with a threaded air outlet 15 for coupling to a hose (not shown) for delivering air to a tire. An air passage 16 is formed in the central housing 11 for passage of air from the inlet 14 to the outlet 15. The passage 16 communicates with a valve structure 17 formed with a valve seat 18 and an outlet passage 19. The passage 19 communicates with a passage 20 which opens into the air outlet 15. The valve housing 17 is fitted to a recess 21 formed in the central housing 11. An O-ring 22 is provided to seal the valve structure 17 and other similar O-rings are also provided at other points, as illustrated, for sealing purposes. The valve seat 18 is intended to seat a normally closed valve 24 having a valve stem 25. An expansion spring 26 is provided which operates to urge the valve 24 to closed position and to normally hold it in closed position except when unseated in the manner explained hereinafter. It will, therefore be apparent that the valve 24 normally closes or prevents communication between the air inlet 14 and the air outlet 15 through the passages 16, 19 and 20.

The valve 24 is also formed with a lower rod or stem 27, the lower end of which is rounded at 28 to cooperate with a lever 29, which serves to unseat the valve 24 in the manner explained hereinafter.

The lever 29 is fulcrumed on a pin 30 which is fixed to and extends between the walls of the head member 31 of a diaphragm 32. The head member 31 is formed with slots for receiving the lever 29. The lever 29 is forked at one end, at 33, and a pin 34 is provided which lies between the upper and lower tines of the fork 33. At its other end the lever 29 is formed with an upper, relatively long and gently sloping cam surface 40 and with a lower, relatively short and steeply sloping cam surface 41. These cam surfaces are intended to bear against a roller 42 which is rotatably mounted at the lower end of a leaf spring 43, the upper end of which is clamped between the central housing 11 and the top cover member 12. It will be apparent that, whatever the position of the lever 29, the roller 42 will bear against one or the other of the cam surfaces 40, 41 and will hold the lever in that position until a sufficiently great opposing force is applied in the manner explained hereinafter.

The diaphragm 32 is clamped in position by means of a bushing 32a and by means of screws (not shown). A space 45 is provided below the diaphragm 32 which communicates with the air outlet 15 through a passage 50 formed in the central housing 11 and a passage 51 formed in the bottom cover member 13.

A check valve 52 is provided to restrict passage of air from the outlet 15 to the space 45. The valve 52 is urged against a seat 53 by an expansion spring 54, and the seat 53 is formed with a leak passage 55 for leakage of air past the check valve into the passage 51 and the space 45. It will be apparent that pressure in the space 45 beneath the diaphragm 32 will tend to equalize with pressure in the air outlet 15. Thus, when the pressure in the air outlet 15 exceeds that in the space 45, air will leak through the leak passage 55, past check valve 52 into the passage 51 and thence into the space 45. If pressure in the space 45 is greater than that in the air outlet 15, the air will pass in the opposite direction.

It will be apparent that if the diaphragm 32, and with it the diaphragm head 31, are moved downwardly a sufficient distance, the roller 42 will ride up the lower cam surface 41 on the lever 29 and will snap over onto the upper cam surface 40. In so doing, the roller 42 will instantly rock the lever 29 in clockwise direction. The forked end 33 of the lever will then push up against the rod 27 and will unseat the valve 24. Communication will thus be established between the air inlet 14 and the air outlet 15. It will be apparent, of course, that if the diaphragm 32 is moved upwardly, the opposite action will result; that is, the roller 42 will ride down the upper cam surface 40 onto the lower cam surface 41 and will instantly snap the lever 29 in counterclockwise direction, thereby retracting the fork 33 from the rod 27 and allowing the valve 24 to close.

For the purpose of controlling the operation of the diaphragm 32, an expansion spring 60 is provided which is compressed between the diaphragm head 31 and a cap or plug 61 which is seated on the upper end of the spring 60. The degree of compression of, hence the force exerted by the spring 60, is adjustable by the means which will now be described. As illustrated, a screw 62 is provided which extends through and is in threaded engagement with an opening 63 formed in the top cover member 12. The screw 62 is provided with a button 64 at its lower end for bearing against the plug 61. The upper end of the screw 62 is non-rotatably fixed by means of a key 65 to a hub 66, to which a knob 67 is fixed by means of a set screw 68. The knob 67 is formed with a skirt or flange 69 having a dial 70 thereon. (See Figure 3.)

*Operation*

In operation the tire inflating device thus described and illustrated functions as follows: A hose connected to a source of air under pressure will be connected to the threaded air inlet 14 and the threaded air outlet 15 will be connected to a suitable connecting hose. The knob 67 will be turned until the dial 70 is at the desired reading, e. g., 30 pounds pressure. Air will then be admitted to the air inlet 14 and will pass through the air passage 16 to the valve structure 17. Assuming that the pressure in air outlet 15 is less than 30 pounds per square inch, the pressure in the space 45 below the diaphragm 32 will also be less than 30 pounds per square inch. At a dial setting of 30 pounds per square inch, the force exerted by spring 60 will be sufficient to depress the diaphragm 32, and with it the lever 29, thus causing the roller 42 to ride up the lower cam surface 41 and onto the upper cam surface 40, thereby rocking the lever 29 in clockwise direction, lifting the forked end 33 of the lever and unseating the valve 24. Air will thus be permitted to pass through the valve structure 17 to the tire which is being inflated. If the air pressure in outlet 15 exceeds 30 pounds per square inch, the pressure in the space 45 will also be caused to exceed 30 pounds per square inch. Accordingly, the diaphragm 32 will be pushed upwardly against the force of the spring 60. The lever 29 will accordingly be rocked in counterclockwise direction, thereby retracting the forked end 33 of the lever and allowing the valve 24 to seat, thus closing communication between the air inlet 14 and the air outlet 15. It will, therefore, be apparent that a pulsating operation will result in which air is alternately supplied to and cut off from the air outlet 15.

The operation described above is automatic and is the preferred mode of operation for many purposes. However in the interest of saving time it may be desirable to inflate a large tire, such as a truck tire, under full line pressure, at least during the initial stages of inflation. To this end an override or by-pass structure and mode of operation are provided which will now be described.

The plug 61 which is seated on the upper end of the spring 60, and which provides a bearing surface for the screw 62, is formed with a shank or stem 75, the lower end 76 of which is normally spaced above the diaphragm head 31. However, the lower end 76 of the shank 75 is located sufficiently near the diaphragm head that, when the dial is turned to a setting above a predetermined pressure, e. g., above 45 pounds per square inch, the lower end 76 of the shank 75 will bear continuously against the diaphragm head 31 and will depress it sufficiently to rock the lever 29 in clockwise direction. This, as will be observed, will unseat valve 24, will effectively override or by-pass the automatic, pulsating operation of the device and will deliver full line pressure as long as the dial setting remains unchanged. As illustrated, the range above 45 pounds per square inch is indicated on the dial 70 as "Open," i. e., at a dial setting above 45 pounds, communication between air inlet 14 and outlet 15 is open.

It will be apparent that the override feature can be brought into operation at any selected pressure, by selecting a plug 61 having a shank 75 of the proper length. In Figure 2 there is shown an alternative and preferred embodiment of the invention in which the override feature is more easily adjustable and obviates the necessity of providing a different plug for each maximum automatic pressure.

It is apparent that in addition to the selection of a plug 61 having a shank 75 of proper length for operation of the device at a selected pressure that the action of the spring 60 must be overcome before full line operation is effected. The vagaries of springs, such as 60 are well-known. Accordingly, the preferred form shown in Figure 2 is made adjustable for securing full line pressure above any predetermined dial reading, usually when reading "Open," without relation to the spring 60 and the infinite variations between individual springs.

Referring now to Figure 2, an adjustment screw **62*a* is provided which is similar to the screw 62 in Figure 1, except that it is formed with an axial passage 81, and at its lower end it is fitted with a tubular thrust bushing 82 which is formed with an axial passage 83 to register with the passage 81. The thrust bushing 82 is intended to bear against a plug 61*a* which is generally similar to the plug 61 shown in Figure 1 but is intended to be non-rotatable and is guided for vertical sliding movement by means of a key 85 which is formed in the plug, and a key-way 86 formed in the central housing 11 of the inflating device. The plug 61*a* is formed with a threaded axial passage 87 to register with the passage 81 formed in the adjustment screw, and a screw 88 is received in the passage 87 and is in threaded engagement therewith. The screw 88 is formed with a slot such as shown at 89**, or with a socket to receive a screw driver or wrench.

The device illustrated in Figure 2 operates in a generally similar manner to that illustrated in Figure 1. That is, the screw **62*a* is turned, by means of the knob 67, to the desired dial setting for automatic operation. To by-pass the automatic operation and deliver full line pressure, the screw 62*a* is turned until the lower end of the screw 88 bears against the diaphragm head 31 and rocks the lever 29. The provision of a screw such as shown at 88, and of access thereto as by means of the passages 81, 83 and 87, makes it possible easily to adjust the device to by-pass the automatic features at any selected pressure. It is not necessary to provide a separate plug for each maximum automatic pressure; the plug is easily adjustable by means of the screw 88. When the screw 88 has been adjusted it may be locked in position by means of a lock (not shown) or by deforming the tubular shank 75**.

It will thus be apparent that a tire inflating device has been provided which is operable to automatically inflate a tire to a predetermined pressure, the said device operating with a pulsating action to deliver air from a source of compressed air to a tire until the tire has been inflated to a predetermined pressure, and then terminating the inflating operation. The device is also operable to deliver full line pressure to a tire where such is desired, as in inflation of large truck tires. One embodiment of the invention, namely, that illustrated in Figure 2, lends itself to rapid and easy adjustment of the override feature to deliver full line pressure to a tire at any desired pressure.

I claim:

1. An inflating device of the character described comprising a housing having an inlet, an outlet, passage for communicating said inlet with said outlet, and a check valve located in said passage and normally acting to close the same; a central bore in said housing; a diaphragm dividing said central bore and communicating on one side with said outlet; a coil spring compressed against the opposite side of said diaphragm in opposition to fluid pressure in the outlet; snap-acting cam means coacting with a snap spring and mounted on said diaphragm operable to open said valve when said diaphragm is moved in opposition to outlet pressure; means for adjusting the compression of said coil spring comprising a tubular plug at one end of said coil spring opposite said diaphragm, a screw bearing against said plug and a dial for operating the screw and making the setting; and means in the form of a screw in axial threaded engagement within said tubular plug and projecting toward said diaphragm, said screw being adjustable to vary its distance from said diaphragm and to thereby bear directly against the diaphragm to render said compression spring inoperable and maintain said valve in open position, at an operating setting above the value of the setting on the compression spring.

2. An inflating device of the character described having a casing with an inlet and an outlet; a chamber in said casing; a valve in said chamber for closing and opening communication between said inlet and outlet, said valve being normally closed; a central bore in said casing; a pressure-responsive member dividing said bore into two chambers, one communicating with said outlet; snap-acting cam means coacting with a snap spring and carried by said pressure-responsive member to open the valve when said member is moved in opposition to outlet pressure; control means for exerting a force on said pressure-responsive member in opposition to outlet pressure, said control means including an expansion spring bearing against said member for setting the operation of the device and varying the compression of said spring over a range of pressures; and an adjustable plug member positioned axially in said central bore for bearing against said pressure-responsive member for inactivating said snap spring and holding said valve in open position when the operation is above the setting of the said control means.

3. An inflating device of the character described comprising a housing having an inlet, an outlet, a passage for communicating said inlet with said outlet, and a check valve located in said passage normally acting to close the same; a central bore in said housing; a diaphragm dividing said central bore and communicating on one side with said outlet; a coil spring compressed against the opposite side of said diaphragm in opposition to fluid pressure in the outlet; snap-acting cam means coacting with a snap-acting spring and mounted on said diaphragm operable to open said valve when said diaphragm is moved in opposition to inlet pressure; a plug at one end of said coil spring having a shank extending axially through the coil spring and terminating adjacent said diaphragm; screw means and a dial for adjusting the compression of said coil spring so that the coil spring balances the sum of forces exerted by the outlet pressure acting on said diaphragm and by said snap-acting means, at a selected pressure from closed to full open, said shank terminating a distance from said diaphragm such that when said dial is turned to full open the shank will bear against the diaphragm and maintain said valve in open position, rendering the snap-acting cam means and the coil spring inoperative.

References Cited in the file of this patent

UNITED STATES PATENTS

| | | |
|---|---|---|
| 2,013,846 | Borel | Sept. 10, 1935 |
| 2,211,664 | Leibing | Aug. 13, 1940 |
| 2,592,673 | Folmsbee | Apr. 15, 1952 |
| 2,638,113 | Sturmer | May 12, 1953 |

FOREIGN PATENTS

| | | |
|---|---|---|
| 11,715 | Austria | May 11, 1903 |
| 60,180 | Austria | July 8, 1913 |
| 547,760 | Great Britain | Sept. 9, 1942 |